United States Patent [19]
Nakamura

[11] Patent Number: 6,070,221
[45] Date of Patent: May 30, 2000

[54] INTERRUPT CONTROLLER

[75] Inventor: Kazuo Nakamura, Tokyo, Japan

[73] Assignee: Mitsubishi Denki Kabushiki Kaisha, Tokyo, Japan

[21] Appl. No.: 09/130,350

[22] Filed: Aug. 13, 1998

[30] Foreign Application Priority Data

Apr. 21, 1998 [JP] Japan ................................. 10-111191

[51] Int. Cl.[7] ................................................. G06F 13/26
[52] U.S. Cl. ........................... 710/264; 710/41; 710/265; 710/266; 712/23; 712/244
[58] Field of Search ............................ 710/264, 41, 265, 710/266; 712/23, 244

[56] References Cited

U.S. PATENT DOCUMENTS

| | | | |
|---|---|---|---|
| 4,470,111 | 9/1984 | Jenkins et al. | 710/41 |
| 4,636,944 | 1/1987 | Hodge | 710/264 |
| 5,133,056 | 7/1992 | Miyamori | 710/264 |
| 5,659,759 | 8/1997 | Yamada | 710/265 |
| 5,764,971 | 6/1998 | Shang et al. | 712/244 |
| 5,905,898 | 5/1999 | Qureshi et al. | 710/266 |

*Primary Examiner*—Ayaz R. Sheikh
*Assistant Examiner*—Frantz Blanchard Jean
*Attorney, Agent, or Firm*—Burns, Doane, Swecker & Mathis, LLP

[57] ABSTRACT

An interrupt controller comprises a plurality of interrupt handling elements that are given different identification numbers for identification to which priorities are assigned. A first priority encoder accepts a plurality of level signals which are given different level numbers respectively representing the priorities assigned to the identification numbers, and then encodes the level number assigned to the highest-priority level signal included among all level signals at a low potential so as to generate an interrupt level number representing the encoded level number. Each interrupt handling element includes a current-sinking unit for sinking one of the level signals specified by the output of a level number register into a ground so that the specified level signal sinks to a low potential, and a comparator for comparing the level number represented by the output of the level number register with the interrupt level number from the first priority encoder to generate a comparison result signal indicating the comparison result. A second priority encoder accepts a plurality of comparison result signals from the plurality of interrupt handling elements, and then encodes the identification number assigned to one of the interrupt handling elements whose identification number has the highest priority and which is included among all interrupt handling elements each of which has furnished a comparison signal indicating that a corresponding level number is equal to the interrupt level number from the priority encoder so as to generate an interrupt identification number representing the encoded identification number.

3 Claims, 8 Drawing Sheets

| INPUTS | | | | | | | OUTPUTS | | |
|---|---|---|---|---|---|---|---|---|---|
| R7 | R6 | R5 | R4 | R3 | R2 | R1 | S2 | S1 | S0 |
| L | X | X | X | X | X | X | H | H | H |
| H | L | X | X | X | X | X | H | H | L |
| H | H | L | X | X | X | X | H | L | H |
| H | H | H | L | X | X | X | H | L | L |
| H | H | H | H | L | X | X | L | H | H |
| H | H | H | H | H | L | X | L | H | L |
| H | H | H | H | H | H | L | L | L | H |
| H | H | H | H | H | H | H | L | L | L |

| INPUTS | | | | | | | OUTPUTS | | |
|---|---|---|---|---|---|---|---|---|---|
| M7 | M6 | M5 | M4 | M3 | M2 | M1 | N2 | N1 | N0 |
| H | X | X | X | X | X | X | H | H | H |
| L | H | X | X | X | X | X | H | H | L |
| L | L | H | X | X | X | X | H | L | H |
| L | L | L | H | X | X | X | H | L | L |
| L | L | L | L | H | X | X | L | H | H |
| L | L | L | L | L | H | X | L | H | L |
| L | L | L | L | L | L | H | L | L | H |
| L | L | L | L | L | L | L | L | L | L |

INTERRUPT CONTROLLER

BACKGROUND OF THE INVENTION

1. Field of the Invention

The present invention relates to an interrupt controller for selecting one interrupt request from a plurality of interrupt requests and for generating an interrupt level number representing the priority assigned to the selected interrupt request and an interrupt identification number representing the cause of the selected interrupt request.

2. Description of the Prior Art

In general, most computer systems can control interrupt handling by using two numbers: an interrupt level number and an interrupt identification number. The interrupt level number represents the priority assigned to the interrupt request to be handled or the urgency with which the interruption is to be handled. The interrupt identification number represents the cause of the interruption. Generally, an interrupt controller generates and furnishes such an interrupt level number and an interrupt identification number to a central processing unit or CPU.

Referring now to FIG. 9, there is illustrated a block diagram showing the structure of a prior art interrupt controller. In the figure, reference characters IE10 to IE17 denote interrupt handling elements, A1 to A7 denote interrupt request signals, and S1 to S2 denote three bits of a 3-bit interrupt level number signal, respectively. The 3-bit interrupt level number signal can represent any of eight possible interrupt level numbers 0 through 7 in decimal. When the 3-bit interrupt level number signal represents the number 0, it indicates that there is no interrupt request. On the other hand, when the 3-bit interrupt level number signal represents any of the interrupt level numbers 1 through 7 other than zero, it indicates that there is an interrupt request with the priority corresponding to the value of the 3-bit interrupt level number signal. The interrupt level numbers 1 through 7 indicate priority, with priority increasing in ascending order of the numbers. Reference characters N0 through N2 denote three bits of a 3-bit interrupt identification number signal, respectively. The 3-bit interrupt identification number signal can represent any of eight possible identification numbers 0 through 7 in decimal, which correspond to interrupt request signals A0 through A7, respectively.

Referring next to FIG. 10, there is illustrated a block diagram showing the structure of each of the interrupt handling elements IE10 through IE17. In the figure, reference character CMP denotes a comparator, LR denotes a 3-bit level number register, NR denotes a 3-bit identification number register, SLT denotes a 6-bit selector, and G50 denotes an AND gate. Furthermore, reference character A denotes an interrupt request signal. When the interrupt request signal has a "HIGH" potential or level, it indicates that there is an interrupt request.

As shown in FIG. 11, the comparator CMP is comprised of inverters 11a to 11c, exclusive OR gates 11d and 11e, AND gates 11f through 11j, and OR gates 11k and 11l. When a 3-bit binary number composed of inputs J0 to J2 that lies in the range of 0 to 7 in decimal is greater than another 3-bit binary number composed of other inputs K0 to K2 that lies in the range of 0 to 7 in decimal, the comparator CMP furnishes an output E having a "HIGH" level. The level number register LR as shown in FIG. 10 can furnish a 3-bit output composed of three bits LV0 to LV2, which represents any of the eight possible interrupt level numbers 0 through 7 which is assigned to the interrupt handling element including the level number register LR.

The identification number register NR as shown in FIG. 10 can furnish a 3-bit output composed of three bits CN0 to CN2, which indicates any of eight possible identification numbers 0 through 7 which is assigned to the interrupt handling element including the identification number register NR. When the selector SLT receives an input signal S with a "LOW" potential or level, it can furnish values applied to its terminals T0 to T5 by way of its output terminals Q0 to Q5. On the other hand, when the selector SLT receives an input signal S with a "HIGH" potential or level, it can furnish values applied to its terminals P0 to P5 by way of the output terminals Q0 to Q5. The identification number registers NR of the interrupt handling elements IE0 through IE7 are preset so that they indicate the identification numbers 0 through 7, respectively. The description on a circuit for writing data into the level number register LR and identification number register NR of each interrupt handling element will be omitted hereafter because it is not directly related to the present invention.

Next, a description will be made as to the operation of each of the interrupt handling elements as shown in FIG. 10. The comparator CMP compares the 3-bit output signal composed of the three bits LV0 through LV2 of the level number register LR with a 3-bit input signal composed of three bits IS0 through IS2. If the interrupt level number which is assigned to each of the interrupt handling elements and which is designated by the outputs LV0 through LV2 of the level number register LR is greater than another interrupt level number designated by the inputs IS0 through IS2, the comparator CMP causes its output E to go "HIGH". On the contrary, if the interrupt level number designated by the outputs LV0 through LV2 of the level number register is equal to or less than the other interrupt level number designated by the inputs IS0 through IS2, the comparator CMP causes its output E to go "LOW".

When the output E of the comparator CMP has a "HIGH" level and the interrupt request input A has a "HIGH" level, the AND gate G50 furnishes an output at a "HIGH" level and the selector SLT then furnishes the 3-bit output composed of the three bits LV0 through LV2 of the level number register LR and the 3-bit output composed of the three bits CN0 through CN2 of the identification number register NR as its outputs OS0 through OS2 and ON0 through ON2. Otherwise, the AND gate G50 furnishes an output at a "LOW" level and the selector SLT then furnishes the 3-bit input composed of the three bits IS0 through IS2 and the other 3-bit input composed of the three bits IN0 through IN2 as its outputs OS0 through OS2 and ON0 through ON2.

In other words, the interrupt handling element as shown in FIG. 10 furnishes the outputs LV0 through LV2 of the level number register LR and the outputs CN0 through CN2 of the identification number register NR as its outputs OS0 through OS2 and ON0 through ON2, respectively, when the interrupt request input A has a "HIGH" level and the interrupt level number designated by the outputs LV0 through LV2 of the level number register is greater than another interrupt level number designated by the three inputs IS0 through IS2. On the other hand, when the interrupt request input A has a "LOW" level or the interrupt level number designated by the outputs LV0 through LV2 of the level number register is equal to or less than another interrupt level number designated by the inputs IS0 through IS2, the interrupt handling element furnishes the input signal composed of the three bits IS0 through IS2 and the other input signal composed of the three bits IN0 through IN2 as its outputs OS0 through OS2 and ON0 through ON2, respectively.

Thus, in the case that a plurality of interrupt handling elements IE10 through IE17 each having the structure as shown in FIG. 10 are cascaded as shown in FIG. 9, the interrupt handling element IE17 at the final stage furnishes both the interrupt level number and the identification number which are respectively stored in the level number register LR and identification number register NR of one interrupt handling element with the highest interrupt level or priority included among all interrupt handling elements each of which has received an interrupt request input A at a "HIGH" level, as its outputs S2 through S0 and N2 through N0, respectively.

In the prior art interrupt controller which is so constructed as mentioned above and which can receive eight different interrupt request signals respectively corresponding to eight different causes, a plurality of interrupt handling elements each provided with a comparator and a selector are cascaded and the comparator of each interrupt handling element needs four or five gates arranged between its input and output terminals and the selector of each interrupt handling element needs two or three gates arranged between its input and output terminals. The prior art interrupt controller thus needs 48 to 64 gates to generate and furnish an interrupt level number signal and an interrupt identification number signal from the plurality of interrupt request signals applied thereto. Therefore, a problem with the prior art interrupt controller is that it takes a long time for a change in each interrupt request signal to influence its outputs, i.e., both the interrupt level number signal and the interrupt identification number signal.

In the prior art interrupt controller, a change in each interrupt request signal can directly cause a change in the interrupt identification number signal. Some central processing units process the interrupt identification number signal after they process the interrupt level number signal. For example, if an interrupt request having the identification number 3 is made such a central processing unit accepts the interrupt request by processing the corresponding interrupt level number signal. After that, when the interrupt request signal makes a "HIGH" to "LOW" transition, the prior art interrupt controller causes the interrupt identification number signal to change so that it represents the identification number 0 before the CPU processes the interrupt identification number signal, if there is no other interrupt request. Another problem is thus that the central processing unit CPU realizes by mistake that an interrupt request with the identification number 0 has been made.

SUMMARY OF THE INVENTION

The present invention is made to overcome the above problems. It is therefore an object of the present invention to provide an interrupt controller in which a change in each interrupt request signal can influence both an interrupt level number signal and an interrupt identification number signal quickly.

It is another object of the present invention to provide an interrupt controller in which once it generates an interrupt identification number signal corresponding to an interrupt request and a central processing unit starts processing the interrupt request, it maintains the value of the interrupt identification number signal until the central processing unit processes the interrupt identification number signal.

In accordance with one aspect of the present invention, there is provided an interrupt controller comprising: a plurality of interrupt handling elements which are given different identification numbers for identification to which priorities are assigned; and a first priority encoder which accepts a plurality of level signals which are given different level numbers respectively representing the priorities assigned to the identification numbers, for encoding the level number assigned to the highest-priority level signal included among all level signals having a low potential so as to generate an interrupt level number representing the encoded level number. Each of the plurality interrupt handling elements includes a level number register for storing a level number representing the priority assigned to each of the plurality interrupt handling elements so as to furnish an output representing the level number, a current-sinking unit for sinking one of the level signals specified by the output of the level number register into a ground so that the specified level signal sinks to a low potential, and a comparator for comparing the level number represented by the output of the level number register of each of the plurality interrupt handling elements with the interrupt level number from the first priority encoder so as to generate a comparison result signal indicating whether or not the level number represented by the output of the level number register is equal to the interrupt level number from the first priority encoder. The interrupt controller further comprises a second priority encoder which accepts a plurality of comparison result signals from the plurality of interrupt handling elements, for encoding the identification number assigned to one of the interrupt handling element whose identification number has the highest priority and which is included among all interrupt handling elements each of which has furnished a comparison signal indicating that a corresponding level number is equal to the interrupt level number from the priority encoder so as to generate an interrupt identification number representing the encoded identification number.

In accordance with a preferred embodiment of the present invention, the interrupt controller further comprises a storage unit for storing the interrupt level number from the first priority encoder and the interrupt identification number from the second priority encoder, and a control unit for controlling the storage unit.

Preferably, the control unit compares the interrupt level number which has been stored in the storage unit with a current interrupt level number furnished by the first priority encoder and then updates the contents of the storage unit only if the current interrupt number is greater than the preceding interrupt level number stored in the storage unit.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
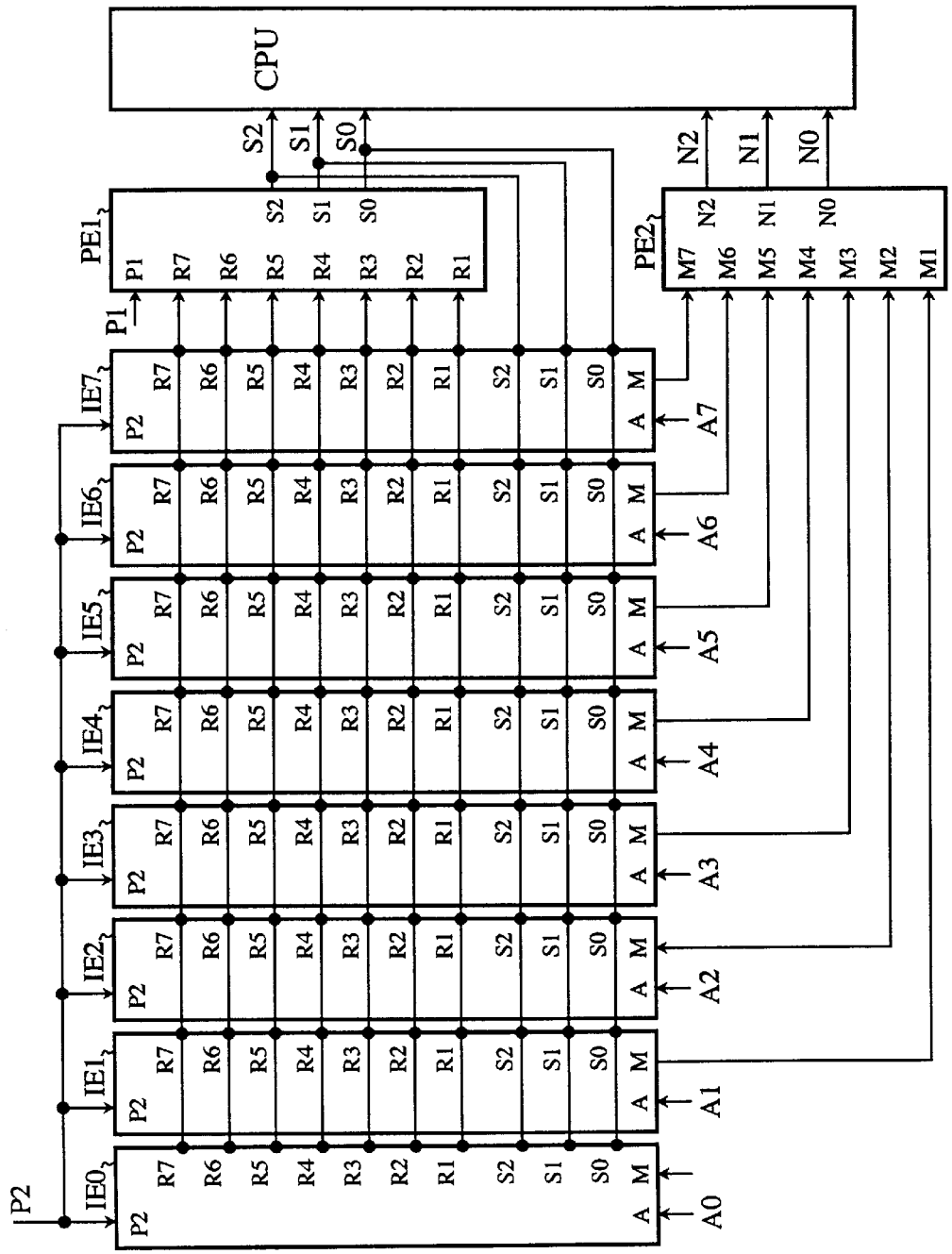
FIG. 1 is a block diagram showing the structure of an interrupt controller according to a first embodiment of the present invention.

Referring next to FIG. 1, there is illustrated a block diagram showing the structure of an interrupt controller according to a first embodiment of the present invention. In the figure, reference characters IE10 to IE17 denote interrupt handling elements, PE1 and PE2 denote first and second priority encoders, respectively, and A0 to A7 denote interrupt request signals. The first priority encoder PE1 furnishes a 3-bit interrupt level number signal composed of three bits S0 to S2. The interrupt level number signal can represent any of eight possible interrupt level numbers 0 through 7. When the 3-bit interrupt level number signal represents the level number 0, it indicates that there is no interrupt request. On the other hand, when the 3-bit interrupt level number signal represents any of the other interrupt level numbers 1 through 7 other than 0, it indicates that there is an interrupt request with the level or priority corresponding to (i.e. indicated by) the value of the 3-bit interrupt level number signal. The interrupt level numbers 1 through 7 indicate priority, with priority increasing in ascending order of the numbers.

Figures 2, 5:
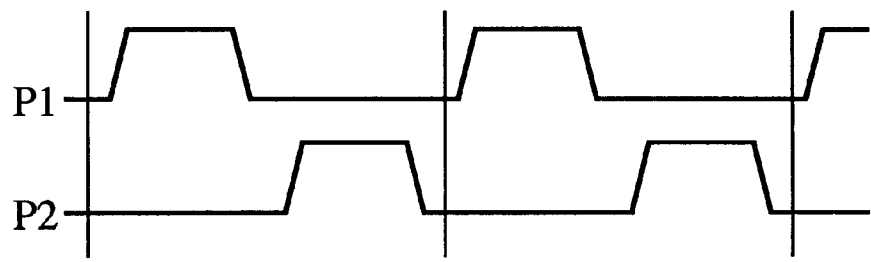
FIG. 2 is a timing diagram showing the waveforms of first and second non-overlap clock signals applied to the interrupt controller according to the first embodiment of the present invention.
FIG. 5 is a diagram showing the truth table of the first priority encoder of FIG. 4.

The second priority encoder PE2 can furnish a 3-bit interrupt identification number signal composed of three bits N0 through N2. The 3-bit interrupt identification number signal can represent any of eight possible identification numbers 0 through 7 which correspond to interrupt signals A0 through A7, respectively. Priority is assigned to the interrupt identification numbers 0 through 7, with priority increasing in ascending order of the numbers. Furthermore, reference characters P1 and P2 denote first and second non-overlap clock signals that are out of phase with each other, respectively. The two non-overlap clock signals P1 and P2 go "HIGH" alternately, as shown in FIG. 2.

Figure 3:
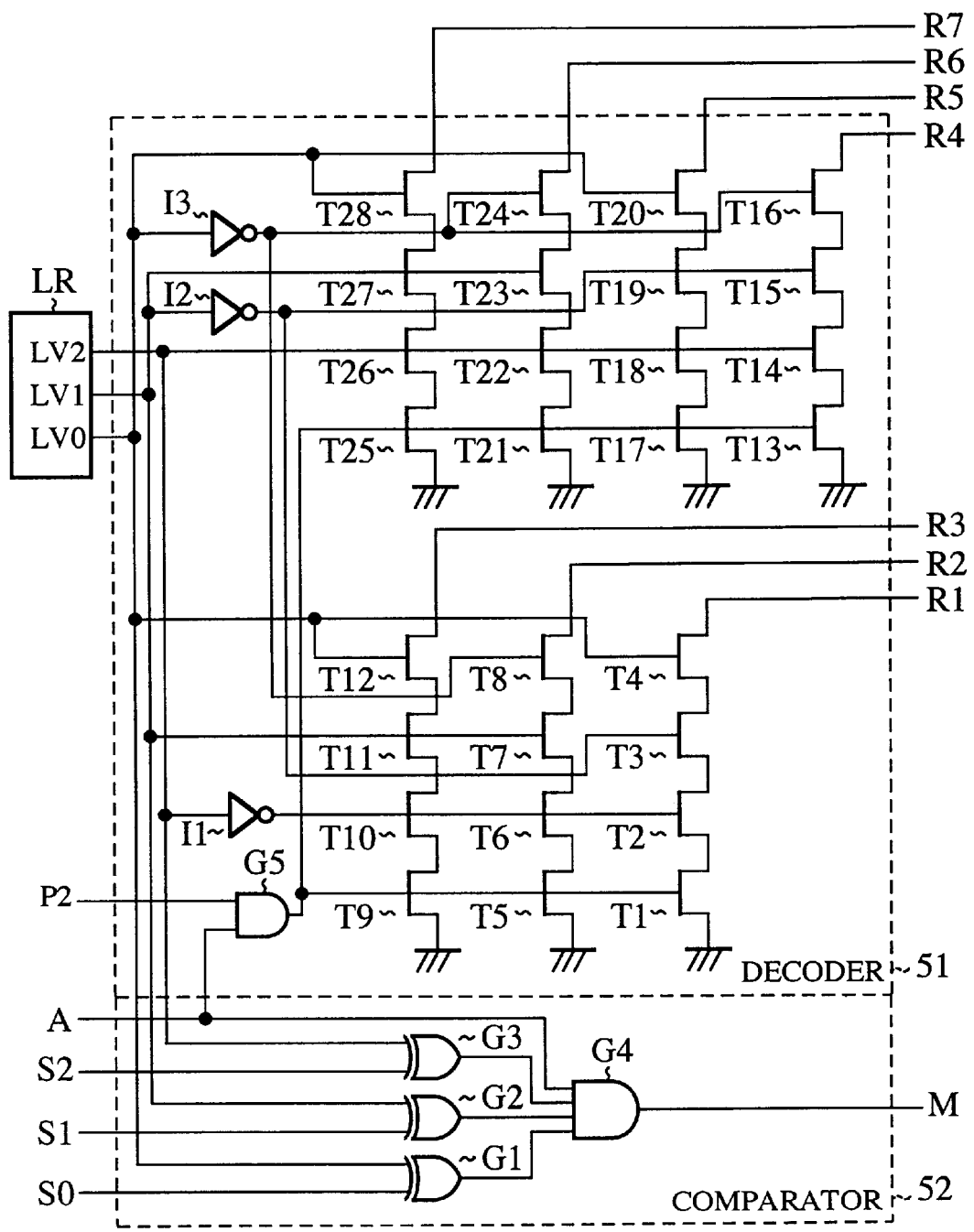
FIG. 3 is a block diagram showing the structure of each of a plurality of interrupt handling elements included in the interrupt controller according to the first embodiment of the present invention.

Referring next to FIG. 3, there is illustrated a block diagram showing the structure of each of the plurality of interrupt handling elements IE10 through IE17. All the interrupt handling elements have the same structure. In the figure, reference character LR denotes a 3-bit level number register, I1 through I3 denote inverters, T1 through T28 denote N-channel transistors, G1 through G3 denote exclusive OR gates, G4 and G5 denote AND gates, and A denotes an interrupt request signal. When the interrupt request signal A has a "HIGH" level, it indicates that there is an interrupt request. Furthermore, reference characters R1 through R7 denote level signals.

The level number register LR can furnish a 3-bit output signal composed of three bits LV0 to LV2, which represents any of the eight possible interrupt level numbers 0 through 7 which is assigned to the interrupt handling element including the level number register LR. The description on a circuit for writing data into the level number register LR will be omitted hereafter because it is not directly related to the operation of the interrupt controller according to the present invention.

The inverters I1 through I3, the N-channel transistors T1 through T28, the AND gate G5 form an open-drain decoder 51, which is disposed as a current-sinking means, capable of, when both the non-overlap clock P2 and the interrupt request input A are "HIGH" and the number designated by the outputs LV0 through LV3 of the level number register LR is equal to any of the numbers 1 through 7 in decimal, sinking a corresponding one of the level signals R1 through R7 into a ground to cause the corresponding level signal to sink to a "LOW" potential or level. The exclusive OR gates G1 through G3, and the AND gate G4 form a comparator 52 for comparing the outputs LV0 through LV2 of the level number register LR with the outputs S0 through S1 of the first priority encoder PE1 bit by bit. When the outputs LV0 through LV1 of the level number register agree with the outputs S0 through S1 of the first priority encoder, respectively, and when the interrupt request input A is "HIGH", the comparator 52 furnishes a comparison result signal M at a "HIGH" level.

Figure 4:
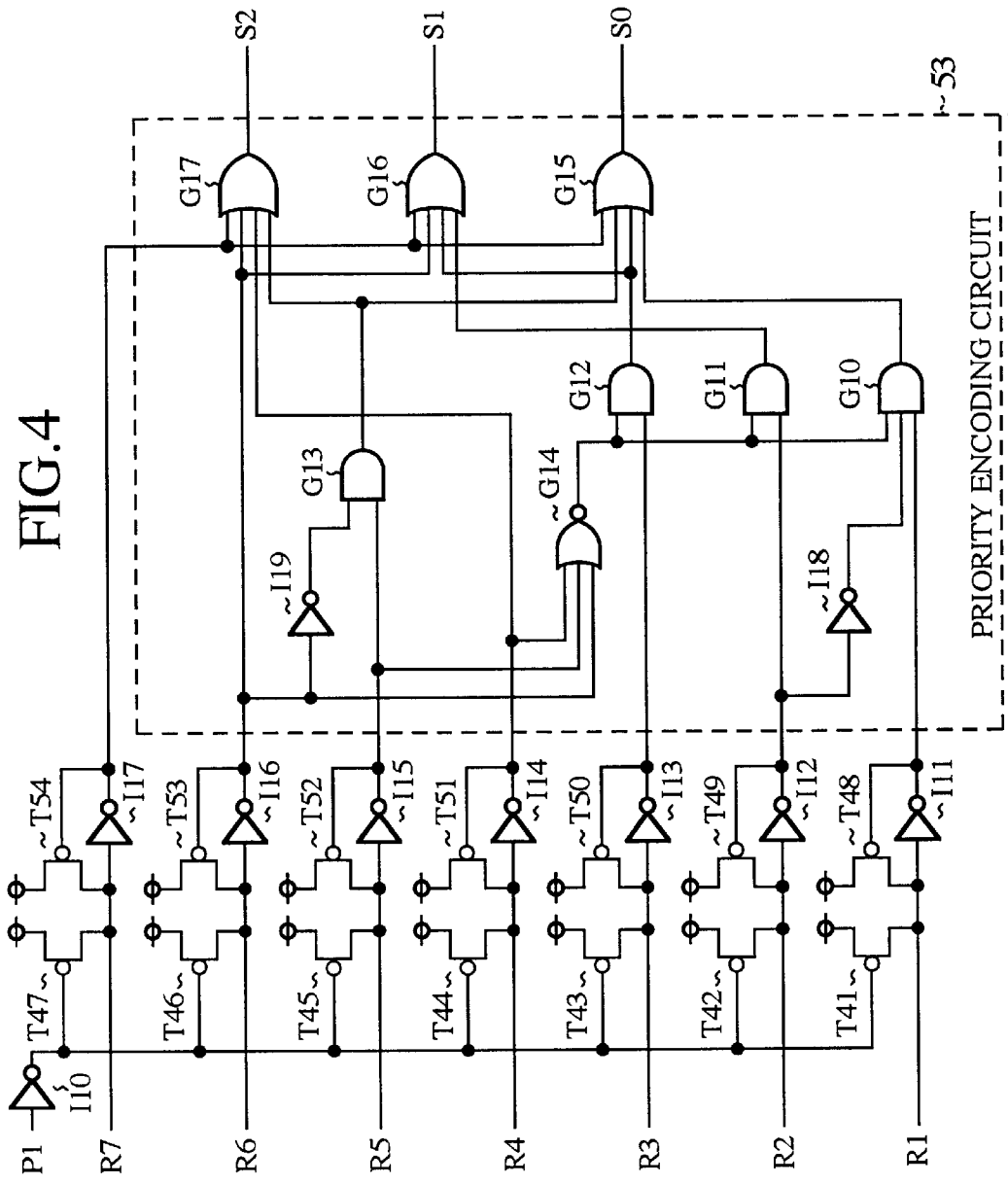
FIG. 4 is a block diagram showing the structure of a first priority encoder of the interrupt controller according to the first embodiment of the present invention.

Referring next to FIG. 4, there is illustrated a block diagram showing the structure of the first priority encoder PE1. In the figure, T41 through T54 denote P-channel transistors, I10 through I19 denote inverters, G10 through G13 denote AND gates, G14 denotes a NOR gate, and G15 through G17 denote OR gates. The first priority encoder PE1 can accept the level signals R1 through R7 from the plurality of interrupt handling elements IE1 through IE7. Priority is assigned to the level signals R1 through R7, with priority increasing in the order of R1, R2, . . . , and R7. The inverter I10 inverts the first non-overlap clock signal P1.

When the first non-overlap clock P1 is "HIGH", the P-channel transistors T41 through T47 are brought into conduction, so that the level signals R1 through R7 become pre-charged and therefore go "HIGH". The inverters I11 through I17 invert the level signals R1 and R7, respectively. The P-channel transistors T48 through T54 are the ones with a low driving capability for holding the pre-charged level signals R1 through R7 in a "HIGH" state. The inverters I18 and I19, the AND gates G10 through G13, the NOR gate G14, and the OR gates G15 through G17 form a priority encoding circuit 53 that can furnish a binary number corresponding to the highest-priority one of all level signals having a "LOW" potential or level included among the level signals R1 through R7, as the three outputs S0 through S2 of the first priority encoder. The truth table of the priority encoding circuit 53 is shown in FIG. 5. In the figure, H shows a "HIGH" level or state, L shows a "LOW" level or state, and X shows a "don't care" state.

Figures 6, 7:
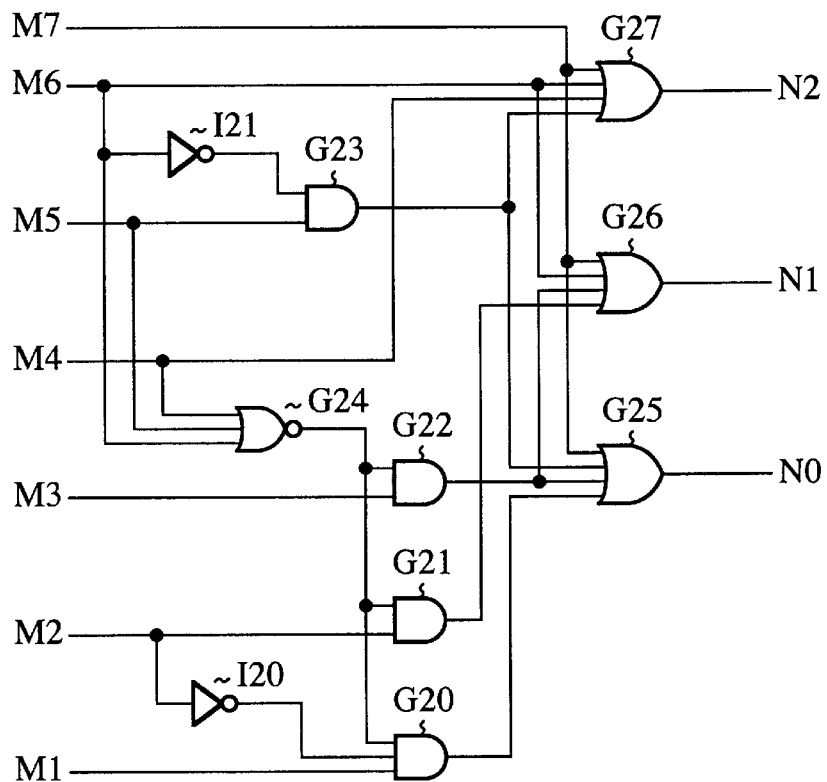
FIG. 6 is a block diagram showing the structure of a second priority encoder of the interrupt controller according to the first embodiment of the present invention.
FIG. 7 is a diagram showing the truth table of the second priority encoder of FIG. 6.

Referring next to FIG. 6, there is illustrated a block diagram showing the structure of the second priority encoder PE2 of the interrupt controller according to the first embodiment of the present invention. In the figure, reference characters I20 and I21 denote inverters, G20 through G23 denote AND gates, G24 denotes a NOR gate, and G25 through G27 denote OR gates. The second priority encoder PE2 can accept inputs M1 through M7 which are the comparison result signals from the second through eighth interrupt handling elements IE1 through IE7, respectively. Priority is assigned to the input signals M1 through M7, with priority increasing in the order of M1, M2, . . . , and M7. The inverters I20 and I21, the AND gates G20 through G23, the NOR gate G24, and the OR gates G25 through G27 are configured in the same way as the priority encoding circuit 53 of the first priority encoder PE1. The second priority encoder PE2 can furnish a binary number corresponding to the highest-priority one of all inputs at a "HIGH" level included among the inputs M1 through M7, as the three outputs N0 through N2 of the second priority encoder. The truth table of the second priority encoding circuit is shown in FIG. 7. In the figure, H shows a "HIGH" level or state, L shows a "LOW" level or state, and X shows a "don't care" state.

Next, a description will be made as to the operation of the interrupt controller according to the first embodiment of the present invention. First, assume that the interrupt request signals A1, A2, A4, and A6 are "HIGH" and the other interrupt request signals A0, A3, A5, and A7 are "LOW". In addition, assume that the level number registers LR of the interrupt handling elements IE1, IE2, IE4, and IE5 are preset so that they can furnish output signals, each composed of three bits LV0 through LV2, representing 5, 1, 5, and 4 in decimal, respectively.

When the first non-overlap clock signal P1 is "HIGH" and the second non-overlap clock signal P2 is "LOW", the P-channel transistors T41 through T47 are turned on and the level signals R1 through R7 become pre-charged, so that they go "HIGH". Then, when the first non-overlap clock signal P1 makes a "HIGH" to "LOW" transition, the P-channel transistors T41 through T47 are turned off. The P-channel transistors T48 through T54 then hold the level signals R1 through R7 in a "HIGH" state. After that, the second non-overlap clock signal P2 makes a "LOW" to "HIGH" transition.

The operation of the interrupt controller cannot be affected by the interrupt handling elements IE0, IE3, IE5, and IE7 because the interrupt request signals A0, A3, A5, and A7 are "LOW". As previously mentioned, in both of the second and fifth interrupt handling elements IE1 and IE4, since the level number 5 is set to the level number register LR, the corresponding N-channel transistors T17 through T20 are turned on and the level signal R5 is sunk into a ground. Since the P-channel transistor T52 of the first priority encoder PE1 has a low driving capability, the level signal R5 sinks to a "LOW" level, i.e., makes a "HIGH" to "LOW" transition. Similarly, in the third interrupt handing element IE2, since the level number 1 is set to the level number register LR, the level signal R1 is sunk into the ground and therefore the level signal R1 makes a "HIGH" to "LOW" transition.

Furthermore, in the seventh interrupt handing element IE6, since the level number 4 is set to the level number register LR, the level signal R4 is sunk into the ground and therefore the level signal R4 makes a "HIGH" to "LOW" transition. As a result, the priority encoding circuit 53 of the first priority encoder PE1 furnishes the binary number 101, i.e. the decimal number 5, assigned to the level signal R5 with the highest priority included among those level signals R1, R4, and R5 at a "LOW" level, as the interrupt level number signal composed of three bits S0 through S2. In other words, the three bits S0 through S2 of the interrupt level number signal are "HIGH", "LOW", and "HIGH", respectively.

The interrupt level number signal composed of the three bits S0 through S2 is fed back into all the interrupt handling elements IE0 through IE7, so that all the interrupt handling elements IE0 through IE7 can know a change in the interrupt level number signal. As a result, each of the interrupt handling elements IE0 through IE7 can compare the three bits S0 through S2 of the interrupt level number signal from the first priority encoder PE1 with the outputs LV0 through LV2 of its level number register LR by means of the exclusive OR gates G1 through G3 and the AND gate G4. In the example mentioned above, the interrupt level number signal composed of the three bits S0 through S2 represents the level number 5 in decimal, the interrupt request input A is "HIGH", and only the level number registers LR of the second and fifth interrupt handling elements IE1 and IE4 furnish outputs LV0 through LV2 representing the level number 5 in decimal. Accordingly, the second and fifth interrupt handling elements IE1 and IE4 furnish comparison result signals M1 and M4 at a "HIGH" level, respectively. On the contrary, the remaining interrupt handling elements IE0, IE2, IE3, IE5, IE6, and IE7 furnish comparison result signals M0, M2, M3, M5, M6, and M7 at a "LOW" level.

In the above case, when the second priority encoder PE2 encodes the comparison result signals M1 through M7, it furnishes the binary number 100, i.e. the decimal number 4, specifying the highest-priority one of all comparison result signals at a "HIGH" level included among the comparison result signals M1 through M7, as the interruption identification number signal composed of three bits N0 through N2. In other words, the three bits N0 through N2 of the interrupt identification number signal are "HIGH", "LOW", and "LOW", respectively.

As previously mentioned, the interrupt controller according to the first embodiment of the present invention can determine the interrupt level number signal composed of three bits S0 through S2 and the interrupt identification number signal composed of three bits N0 through N2 from a plurality of interrupt request signals A0 through A7 by using only a few transistors and a few dozen inverters and logic gates which are arranged between the input terminals for receiving the interrupt request signals A0 through A7 and the output terminals for furnishing the interrupt level number signal composed of bits S0 through S2 and the interrupt identification number signal composed of bits N0 through N2. Accordingly, the interrupt controller of the first embodiment can make a change in each of the interrupt request signals A0 through A7 influence both the interrupt level number signal composed of bits S0 through S2 and the interrupt identification number signal composed of bits N0 through N2 quickly.

Second Embodiment

Figure 8:
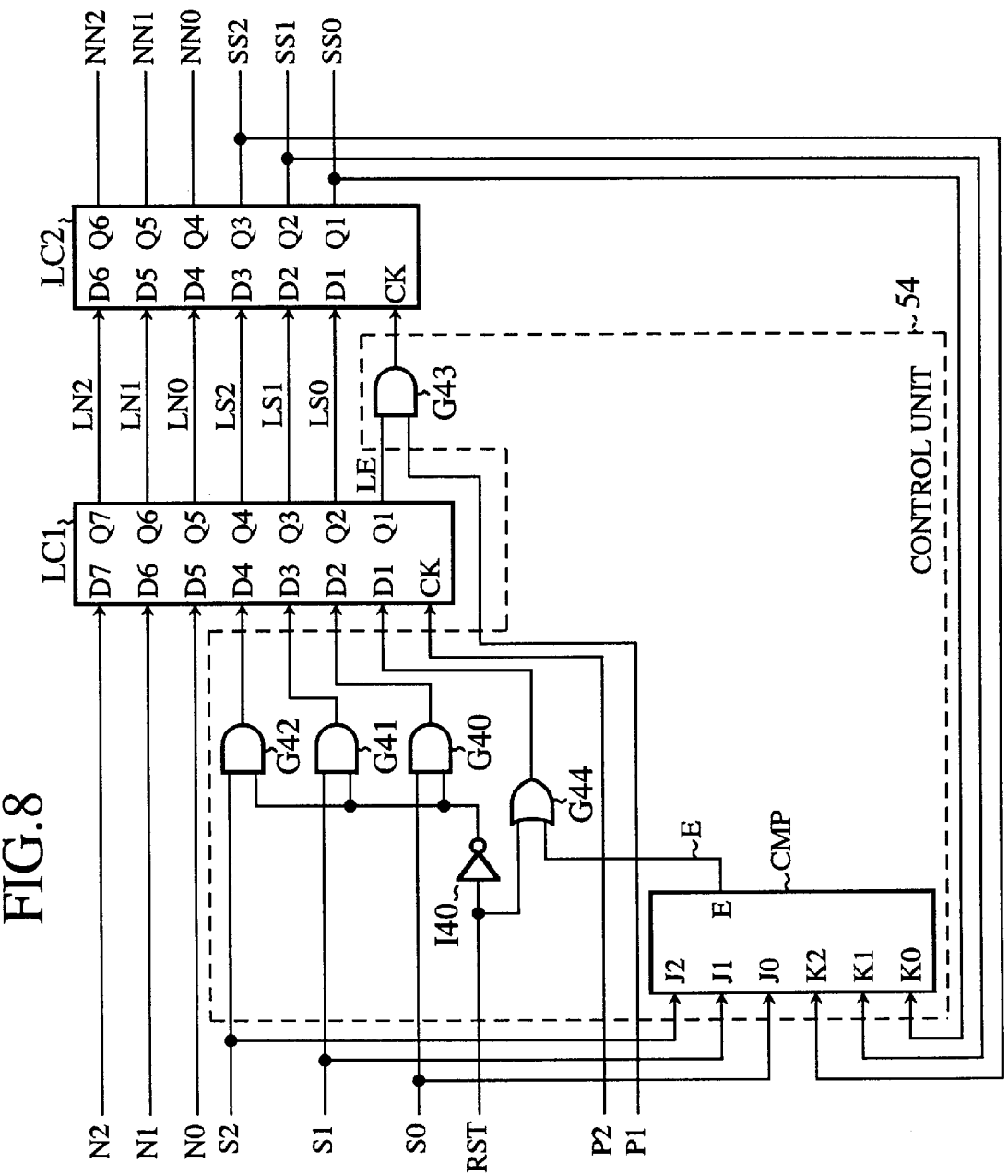
FIG. 8 is a block diagram showing the structure of latch circuitry of an interrupt controller according to a second embodiment of the present invention.
Figure 9:
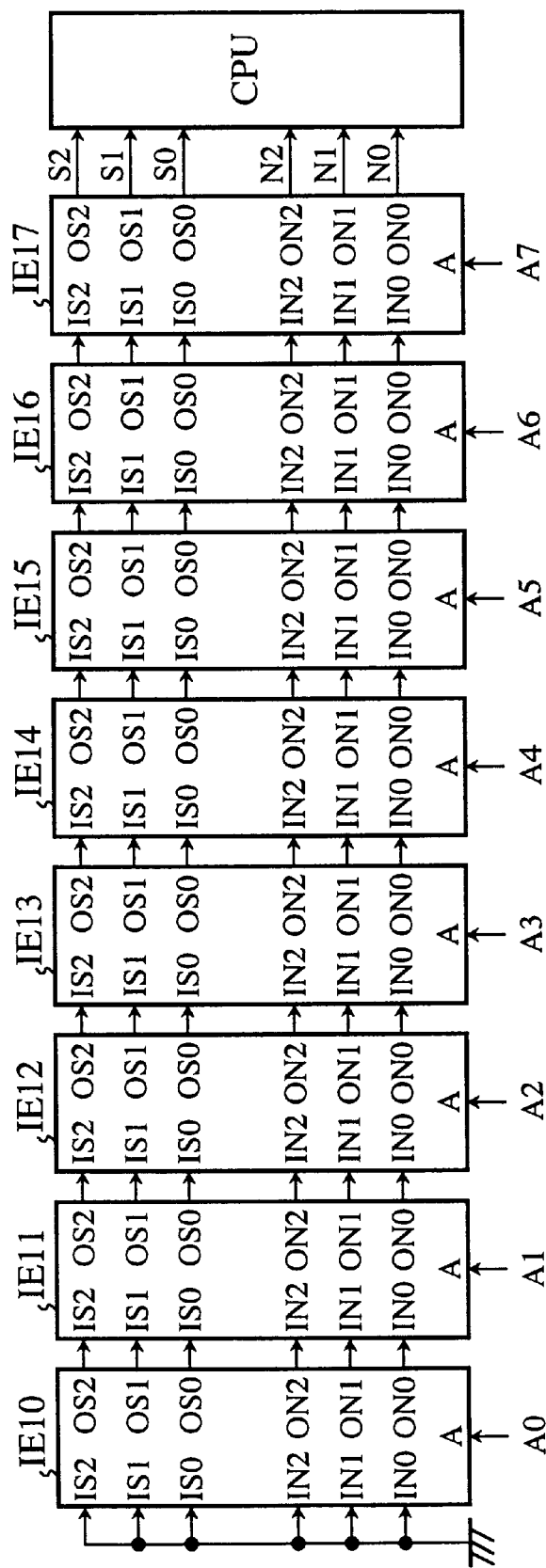
FIG. 9 is a block diagram showing the structure of a prior art interrupt controller.
Figure 10:
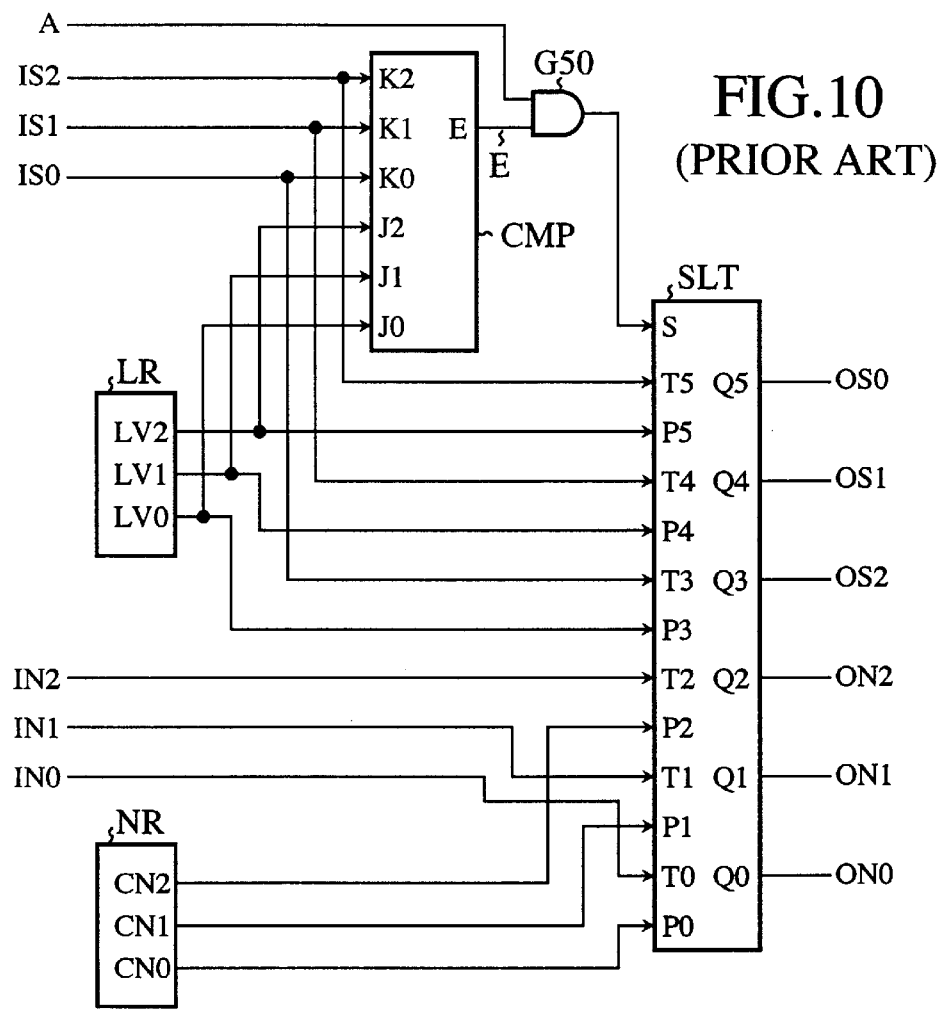
FIG. 10 is a block diagram showing the structure of each of a plurality of interrupt handling elements included in the prior art interrupt controller of FIG. 9.

In the first embodiment, the interrupt level number signal composed of three bits S0 through S2 and the interrupt identification number signal composed of three bits N0 through N2 can be furnished to the central processing unit or CPU, just as they are, as shown in FIG. 1. In this case, each time the second non-overlap clock signal P2 makes a "LOW" to "HIGH" transition, both the interrupt level number signal and the interrupt identification number signal applied to the central processing unit CPU can be updated. In addition to the structure of FIG. 1, an interrupt controller according to a second embodiment of the present invention comprises latch circuitry, as shown in FIG. 8, which can latch both the interrupt level number signal and the interrupt identification number signal so as to hold the states of both the interrupt level number signal and the interrupt identification number signal until the central processing unit CPU processes the interrupt identification number signal. Thus, once the interrupt controller of the second embodiment accepts an interrupt request and the central processing unit CPU starts processing the interrupt request, it does not change the levels of both the interrupt level number signal and the identification number signal which are generated according to the interrupt request until the central processing unit CPU processes the interrupt identification number signal.

In FIG. 8, reference character LC1 denotes a 7-bit latch circuit, LC2 denotes a 6-bit latch circuit, CMP denotes a comparator, I40 denotes an inverter, G40 through G43 denote AND gates, and G44 denotes an OR gate. The comparator CMP, the inverter I40, the AND gates G40 through G43, and the OR gate G44 form a control unit 54 for controlling the first and second latch circuits LC1 and LC2. When the second non-overlap clock signal P2 is "HIGH", the first latch circuit LC1 latches the interrupt level number signal composed of three bits S0 through S2, the interrupt identification number signal composed of three bits N0 through N2, and the output E of the comparator CMP. At that time, if a reset signal RST applied to the inverter I40 is "HIGH", outputs LS0 through LS2 of the first latch circuit LC1 are forceably caused to make a "HIGH" to "LOW" transition and another output E of the first latch circuit LC1 is forceably caused to make a "LOW" to "HIGH" transition by the inverter I40, the AND gates G40 through G42, and the OR gate G44. The second latch circuit LC2 latches the outputs LS0 through LS2, and LN0 through LN2 of the first latch circuit LC1 when the first non-overlap clock signal P1 is "HIGH". The second latch circuit LC2 carries out the latching operation only if the output LE of the first latch circuit LC1 is "HIGH" and the first non-clock signal P1 is "HIGH", that is, only if the output of the ANG gate G43 is "HIGH".

Figure 11:
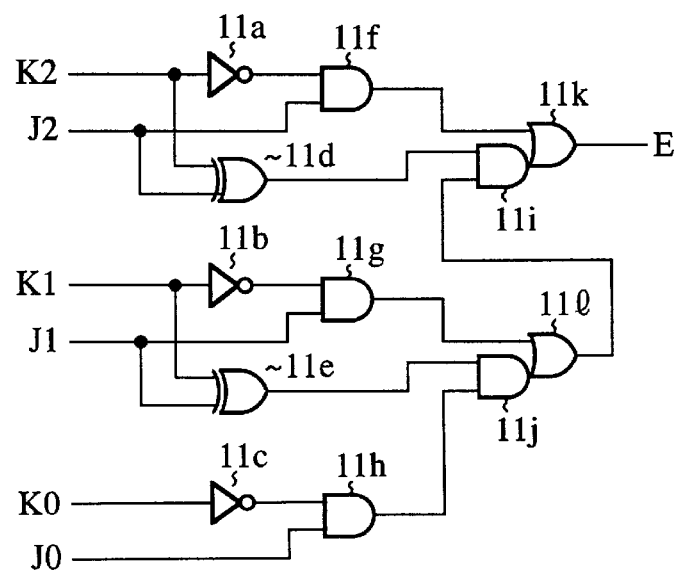
FIG. 11 is a schematic circuit diagram of a comparator included in each of the plurality of interrupt handling elements as shown in FIG. 10.

The comparator CMP has the same structure as that of the prior art interrupt controller as shown in FIG. 11. Only if a binary number composed of three bits J0 through J2, which lies in the range of 0 to 7 in decimal, is greater than a binary number composed of three bits K0 through K2, which lies in the range of 0 to 7 in decimal, the comparator CMP causes its output E to make a "LOW" to "HIGH" transition. The second latch circuit LC2 can furnish the latched interrupt level number signal as its outputs SS0 through SS2. The second latch circuit LC2 can also furnish the latched interrupt identification number signal as its outputs NN0 through NN2.

Thus the interrupt controller according to the second embodiment can furnish both the latched interrupt level number signal composed of the three bits SS0 through SS2 and the latched interrupt identification number signal composed of the three bits NN0 through NN2 to the central processing unit CPU, instead of both the interrupt level number signal composed of the three bits S0 through S2 and the interrupt identification number signal composed of the three bits N0 through N2 according to the first embodiment.

In operation, the reset signal RST is caused to make a "LOW" to "HIGH" transition first. After that, when the second non-overlap clock signal P2 makes a "LOW" to "HIGH" transition, all of the outputs LS0 through LS2 of the first latch circuit LC1 are made "LOW" and the output LE of the first latch circuit LC1 is made "HIGH". When the first non-overlap clock signal P1 then makes a "LOW" to "HIGH" transition, the contents of the second latch circuit LC2 are updated and therefore all of the outputs SS0 through SS2 are made "LOW". After that, the reset signal RST is caused to make a "HIGH" to "LOW" transition. The initial setting is thus completed.

Consider the operation of the latch circuitry when all the three bits S0 through S2 of the interrupt level number signal are "LOW", i.e. when the interrupt level number signal from the first priority encoder PE1 as shown in FIG. 1 representing the level number 0 is applied to the latch circuitry in the initial condition. Since all of the outputs SS0 through SS2 of the second latch circuit LC2 are "LOW", the output E of the comparator CMP goes "LOW". The first latch circuit LC1 latches the output E at a "LOW" level when the second non-overlap clock signal P2 makes a "LOW" to "HIGH" transition. As a result, the output LE of the first latch circuit LC1 is made "LOW" and therefore the contents of the second latch circuit LC2 are not changed because the output of the AND gate G43 goes "LOW".

Next, consider the operation of the latch circuitry when the least significant bit S0 of the interrupt level number signal is "HIGH" and the other bits S1 and S2 are "LOW", i.e. when the interrupt level number signal from the first priority encoder PE1 as shown in FIG. 1 representing the level number 1 is applied to the latch circuitry in the initial condition. Since all of the outputs SS0 through SS2 of the second latch circuit LC2 are "LOW", the output E of the comparator CMP goes "HIGH". The first latch circuit LC1 latches the output E at a "HIGH" level when the second non-overlap clock signal P2 makes a "LOW" to "HIGH" transition. As a result, the output LE of the first latch circuit LC1 is made "HIGH" and therefore the contents of the second latch circuit LC2 are updated because the output of the AND gate G43 goes "HIGH". Accordingly, the outputs SS0 through SS2 and NN0 through NN1 of the second latch circuit LC2 are updated to new values.

The second latch circuit LC2 thus updates its contents only if a binary number designated by the current outputs S0 through S2 of the first priority encoder PE1 is greater than the latched interrupt level number designated by its current outputs SS0 through SS2. In other words, only if there is another interrupt request whose priority is higher than that assigned to the interrupt request which is being processed, the second latch circuit LC 2 updates its contents.

Accordingly, once an interrupt request is made and the CPU starts handling the interrupt request, the latch circuitry does not change its contents even though the interrupt request does not exist anymore and all the interrupt request signals A0 through A7 are therefore "LOW". After the central processing unit CPU processes the interrupt identification number signal, the second latch circuit LC2 can be brought back into the initial state by making the reset signal RST go "HIGH".

As previously mentioned, the latch circuitry according to the second embodiment of the present invention can latch both the interrupt level number signal from the first priority encoder PE1 of FIG. 1 and the interrupt identification number signal from the second priority encoder PE2 of FIG. 1. Therefore, once an interrupt request is made and the CPU starts handling the interrupt request, the latch circuitry maintains the output levels of both the interrupt level number signal and the interrupt identification number signal until the CPU processes the interrupt identification number signal even though the interrupt request does not exist. Furthermore, since the latch circuitry can update its contents only if a binary number designated by the current outputs S0 through S2 of the first priority encoder PE1 is greater than the latched interrupt level number designated by its current outputs SS0 through SS2, the CPU can process the higher-priority interrupt request, which has been made after the preceding interrupt request being processed was made, prior to the processing of the preceding interrupt request.

Many widely different embodiments of the present invention may be constructed without departing from the spirit and scope of the present invention. It should be understood that the present invention is not limited to the specific embodiments described in the specification, except as defined in the appended claims.

What is claimed is:

1. An interrupt controller comprising:

a plurality of interrupt handling elements which are given different identification numbers for identification to which priorities are assigned; and a first priority encoder which accepts a plurality of level signals which are given different level numbers respectively representing said priorities assigned to said identification numbers, for encoding the level number assigned to the highest-priority level signal included among all level signals with a low potential so as to generate an interrupt level number representing the encoded level number;

each of said plurality of interrupt handling elements including a level number register for storing a level number representing the priority assigned to each of said plurality of interrupt handling elements so as to furnish an output representing the level number, a current-sinking means for sinking one of said level signals specified by said output of said level number register into a ground so that said specified level signal sinks to a low potential, and a comparator for comparing the level number represented by said output of said level number register of each of said plurality of interrupt handling elements with the interrupt level number from said first priority encoder so as to generate a comparison result signal indicating whether or not the level number represented by said output of said level number register is equal to the interrupt level number from said first priority encoder, said interrupt controller further comprising a second priority encoder which accepts a plurality of comparison result signals from said plurality of interrupt handling elements, for encoding the identification number assigned to one of said interrupt handling elements whose identification number has the highest priority and which is included among all interrupt handling elements each of which has furnished a comparison signal indicating that a corresponding level number is equal to the interrupt level number from said first priority encoder so as to generate an interrupt identification number representing the encoded identification number.

2. The interrupt controller according to claim 1, further comprising a storage means for storing the interrupt level number from said first priority encoder and the interrupt identification number from said second priority encoder, and a control means for controlling said storage means.

3. The interrupt controller according to claim 2, wherein said control means compares the interrupt level number which has been stored in said storage means with a current interrupt level number furnished by said first priority encoder and then updates the contents of said storage means only if the current interrupt level number is greater than the preceding interrupt level number stored in said storage means.

* * * * *